(12) United States Patent
French

(10) Patent No.: US 7,712,705 B2
(45) Date of Patent: May 11, 2010

(54) DECELERATION DEVICE

(75) Inventor: Clive French, Woodthorpe Nottingham (GB)

(73) Assignee: Airbus Deutschland GmbH (DE)

( * ) Notice: Subject to any disclaimer, the term of this patent is extended or adjusted under 35 U.S.C. 154(b) by 217 days.

(21) Appl. No.: 11/715,285

(22) Filed: Mar. 7, 2007

(65) Prior Publication Data

US 2007/0235588 A1 Oct. 11, 2007

Related U.S. Application Data

(60) Provisional application No. 60/780,490, filed on Mar. 8, 2006.

(30) Foreign Application Priority Data

Mar. 8, 2006 (EP) ................................ 06004706

(51) Int. Cl.
*B64C 1/14* (2006.01)
(52) U.S. Cl. ................. 244/129.5; 242/379.1; 280/805; 188/187
(58) Field of Classification Search ................ 297/470; 244/118.3, 118.5, 129.5; 242/379.1, 382.1, 242/387, 438, 571.4, 375.3, 375; 188/184, 188/185, 187, 188, 380, 282.9; 49/314, 43
See application file for complete search history.

(56) References Cited

U.S. PATENT DOCUMENTS

| | | | | |
|---|---|---|---|---|
| 2,659,573 | A * | 11/1953 | Smith, Sr. ................. | 242/379.1 |
| 3,182,935 | A | 5/1965 | Wischhoefer | |
| 3,855,731 | A * | 12/1974 | Yerkes ........................... | 49/70 |
| 4,230,352 | A | 10/1980 | Sealey et al. | |
| 4,601,446 | A * | 7/1986 | Opsahl ..................... | 244/129.5 |
| 5,074,483 | A * | 12/1991 | Wang ......................... | 242/376 |
| 5,562,260 | A * | 10/1996 | Salvador et al. .......... | 242/397.1 |
| 5,782,511 | A | 7/1998 | Schwarz et al. | |
| 5,785,269 | A * | 7/1998 | Miller et al. ............. | 242/379.1 |
| 5,848,781 | A * | 12/1998 | Kulhavy et al. ............. | 254/360 |
| 5,906,421 | A * | 5/1999 | Floyd ......................... | 312/297 |
| 6,230,999 | B1 * | 5/2001 | Tanaka ..................... | 242/578.2 |
| 7,255,376 | B2 * | 8/2007 | Pratt et al. .................. | 292/201 |
| 2004/0094670 | A1 | 5/2004 | Pratt et al. | |
| 2005/0082433 | A1 | 4/2005 | Saku et al. | |
| 2006/0266887 | A1 * | 11/2006 | Holder ..................... | 244/129.5 |

FOREIGN PATENT DOCUMENTS

| | | |
|---|---|---|
| DE | 516 627 | 1/1931 |
| FR | 2 002 658 | 10/1969 |
| GB | 1 186 157 | 4/1970 |

* cited by examiner

*Primary Examiner*—Michael Carone
*Assistant Examiner*—Brian M O'Hara
(74) *Attorney, Agent, or Firm*—Lerner, David, Littenberg, Krumholz & Mentlik, LLP

(57) ABSTRACT

A deceleration device adapted for gradual dissipation of kinetic energy comprises a spool reel carrying a belt being wound up on the spool reel; an elevating spindle being driven by the spool reel when the belt is being retracted from the spool reel; at least one collet screwed to the elevating spindle; and at least one spring assembly being installed between the collet and a fixed bearing portion of the deceleration device. The at least one collet is screwed towards the fixed bearing portion by retraction of the belt from the spool reel thereby compressing the spring assembly, whereby a reaction load is generated by the spring assembly counteracting the retraction of the belt.

9 Claims, 4 Drawing Sheets

DECELERATION DEVICE

CROSS-REFERENCE TO RELATED APPLICATIONS

This application claims the benefit of the filing date of U.S. Provisional Patent Application No. 60/780,490 filed Mar. 8, 2006, the disclosure of which is hereby incorporated herein by reference.

BACKGROUND OF THE INVENTION

The present invention relates to dissipation of energy. In particular, the present invention relates to a deceleration device which is adapted to gradually dissipate kinetic energy. Moreover, the present invention relates to a cockpit door which is adapted to be connected to the deceleration device as well as to an aircraft being provided with a cockpit door comprising the deceleration device of the present invention.

The cockpit door aboard an aircraft provides the primary means of dissipating pressure from the cabin to the cockpit during a cockpit decompression case. A cockpit decompression case may occur as a minimal opening involving relatively slow bleed of pressure up to a maximum opening (as defined by aviation authorities) involving a rapid loss of pressure. To ensure that the delta pressure build up upon the monuments and structure that form the physical barrier between the cabin and cockpit does not exceed the structural limitations, the cockpit door must release and open to a specific venting area within a short time frame. Delay of the door to provide adequate venting may result in catastrophic structural failure.

The total time frame for the door to provide an effective venting area may be defined as the time [ms] for releasing the door lock and the time [ms] for rotating the door open, for example to an opening angle of more than 80.

To satisfy certain certification requirements defined by aviation authorities, it has to be demonstrated that an aircraft can survive a decompression case without subsequent loss of essential structure/equipment and life. For example, JAR 25.365(e) (2) specifies that the aircraft structure must be able to withstand the depressurisation caused by an instant opening of a predetermined area in the pressurised shell, at any operating altitude.

From the beginning of a cockpit decompression event to the point of door lock release delta air pressure is acting upon the door, as time from the decompression event increases, so the delta air pressure load upon the door increases. The delta air pressure load causes the door to rotate open and accelerate, imparting kinetic energy into the door. In this connection, the resultant kinetic energy is dependant upon the air pressure load over time and the moment of inertia (MOI) of the door. This means that the slower the door is unlocked the higher the delta air pressure load at the point of release and that the higher the MOI of the door the longer the duration of (high) air pressure upon the door. Both factors increase the final kinetic energy of the door. Thus cockpit doors that are compliant with post the 9/11 security rules have a high kinetic energy due to the reinforced construction of the door.

Therefore, the cockpit doors should unlock rapidly and rotate through to a minimum venting area (for example more than 80°) as quickly as possible in the event of a cockpit decompression.

Once the door has rotated open sufficient to provide effective venting it must be decelerated, wherefore the energy present in the door must be dissipated without the door detaching (from its hinges) and without damage to the airframe. In particular, since a seat may be installed in the path of the rotating door, it must be ensured that no injuries will be caused to a flight crew member on that seat. Otherwise, without an effective means of energy dissipation, the door, once it has passed 90 degrees, will collide with the seat causing potential injury to occupant and possible detachment of the seat and/or detach the door from its hinges, causing unacceptable structural/equipment damage and possible crew injury.

The energy present in the door must be absorbed without adversely affecting the cockpit wall pressure difference. Allowing the door to rotate open unhindered to the minimum free venting area would advantageously limit the pressure difference load upon the cockpit wall. However the distance to decelerate the door before impact with the adjacent seat is minimal and amounts to approximately 13° of rotation in A 380 aircraft only. In this case, the resultant equivalent static reaction load applied at the centre of area of the door would be in excess of 4500 daN (4.500 kg), whereby the door as well as the adjacent seat might be damaged.

SUMMARY OF THE INVENTION

Amongst other things, there may be a need to provide a realization, which is adapted to generate a reacting force to gradually reduce the end energy of a cockpit door in the event of a cockpit decompression.

Amongst other things, the above-mentioned object, which forms a basis of the present invention, may be met by a deceleration device which is adapted for gradually dissipating the kinetic energy of a swivelling door, for example, in the event of a cockpit decompression. Inter alia, the deceleration device comprises a spool reel which is designed to carry a belt which is wound up on the spool reel. The belt of the spool reel is adapted to be automatically connected to the cockpit door in the event of a cockpit decompression in order to absorb the kinetic energy of the cockpit door. The deceleration device moreover comprises an elevating spindle which is adapted to be driven by said spool reel in the event that the belt is being retracted from the spool reel. The deceleration device includes at least one collet which is screwed to the elevating spindle so that the collet may move in a longitudinal direction of the elevating spindle due to a rotation of the spool reel. For purposes of dissipating kinetic energy, the deceleration device includes at least one spring assembly which is installed between the collet and a fixed bearing portion of the deceleration device. Hence, the at least one collet will be screwed towards the fixed bearing portion by retraction of the belt from the spool reel whereby the spring assembly will be compressed, so that a reaction load is generated by the spring assembly counteracting the retraction of the belt.

Therefore, by means of the deceleration device it is possible to decelerate the acceleration of a cockpit door, for example, in the event of a cockpit decompression by generating a reacting force which partially counteracts the movement of the door.

According to another exemplary embodiment of the present invention, the spring assembly comprises a plurality of compression springs which are situated between the collet and the spring bearing housing thereby surrounding the elevating spindle. The provision of a plurality of compression springs may be useful since in the event that a single spring should break down, the deceleration device will remain operative. For example, the plurality of compression springs may coaxially surround the elevating spindle. As an alternative, the plurality of compression springs may be disposed in regular intervals around the elevating spindle.

According to a further embodiment of the invention, the collet may be shaped in the form of a polygon in plan view which comprises a plurality of rounded edges which form receptacles for the plurality of compression springs which are disposed at regular intervals around the elevating spindle.

To avoid a rotation of the collet due to rotation of the elevating spindle, the deceleration device may further comprise at least one cup-shaped housing comprising a cam profile which matches the polygonal shape of the collet to allow the collet to slide into the housing and to avoid rotation of the collet. In this embodiment, the fixed bearing portion mentioned above forms part of the base of the housing, so that the plurality of compression springs is situated between the base of the cup-shaped housing and the collet. Instead of providing a cup-shaped housing for purposes of guiding the collet in the longitudinal direction of the elevating spindle, it may be possible to provide other guiding means for guiding the collet in longitudinal direction of the elevating spin thereby exclusively avoiding a rotation of the collet with respect to the bearing portion.

According to another exemplary embodiment, the elevating spindle comprises a bearing shaft which is rotatably mounted in the fixed bearing portion and a threaded shaft sleeve surrounding the bearing shaft. In this embodiment, the bearing shaft, the bearing sleeve and the spool reel surrounding the elevating spindle are connected to each other by means of a single shear pin. The connection of these three elements by means of a single shear pin may be useful, since in case that the total travel of the collet along the elevating spindle should be exploited, further rotation of the spool reel will not damage the elevating spindle as a whole. Rather, the shear pin will be sheared off whereby it is possible that only the shaft sleeve will be damaged and the bearing shaft will remain intact. Moreover, the provision of a single shear pin may be useful since in case that the total travel of the collet along the elevating spindle should be exploited, further kinetic energy will be dissipated by shearing the shear pin or the elevating shaft.

To provide a further means for dissipating kinetic energy in the event that the total travel of the collet along the elevating shaft should be exploited, the deceleration device may further comprise at least one energy-absorbing tube surrounding the elevating spindle which is arranged to come prior into contact with the fixed bearing portion than the at least one collet to dissipate further energy by deformation of the at least one energy absorbing tube. For example, the energy absorbing tube may be connected to the collet surrounding the elevating spindle.

According to yet another exemplary embodiment, the deceleration device may comprise a plurality of wave spring washers, which have a negligible spring constant. In this connection, the plurality of spring washers is connected in series with the plurality of compression springs, so that during an initial rotation of the spool reel no reaction load will be generated due to the negligible spring constant of the plurality of the wave spring washers.

The provision of the wave spring washers may be useful since it may be advantageous to allow the door to open and to initially accelerate as quickly as possible during a first opening angle so that in case of a cockpit decompression the pressure load across the door will not adversely increase.

According to another exemplary embodiment of the present invention, the whole deceleration device is symmetrically and redundantly designed. In this connection, the deceleration device comprises an elevating spindle which features right-hand and left-hand threads at either side of a central portion which is surrounded by the spool reel. Due to a retraction force, the spool reel screws a first collet toward a first fixed bearing portion, thereby compressing a first spring assembly situated between the first collet and the first fixed bearing portion.

Accordingly, due to the rotation of the spool reel initiated by the retraction force applied to the belt, the spool reel screws a second collet toward a second fixed bearing portion, thereby compressing a second spring assembly situated between the first collet and the first fixed bearing portion.

According to a yet another exemplary embodiment of the present invention, a cockpit door is provided which is adapted to be connected to the deceleration device as is illustrated in the preceding paragraphs to decelerate the cockpit door in the event of a cockpit decompression in order to dissipate their kinetic energy.

Finally, according to a last exemplary embodiment aircraft is provided comprising a cockpit door assembly including a deceleration device as illustrated in the preceding paragraphs.

BRIEF DESCRIPTION OF THE DRAWINGS

In the following, the present invention will be illustrated with reference to the drawings enclosed herewith.

In the drawings.

In the following description of the figures, the same reference characters are used for identical or similar elements.

DETAILED DESCRIPTION

Figure 2:
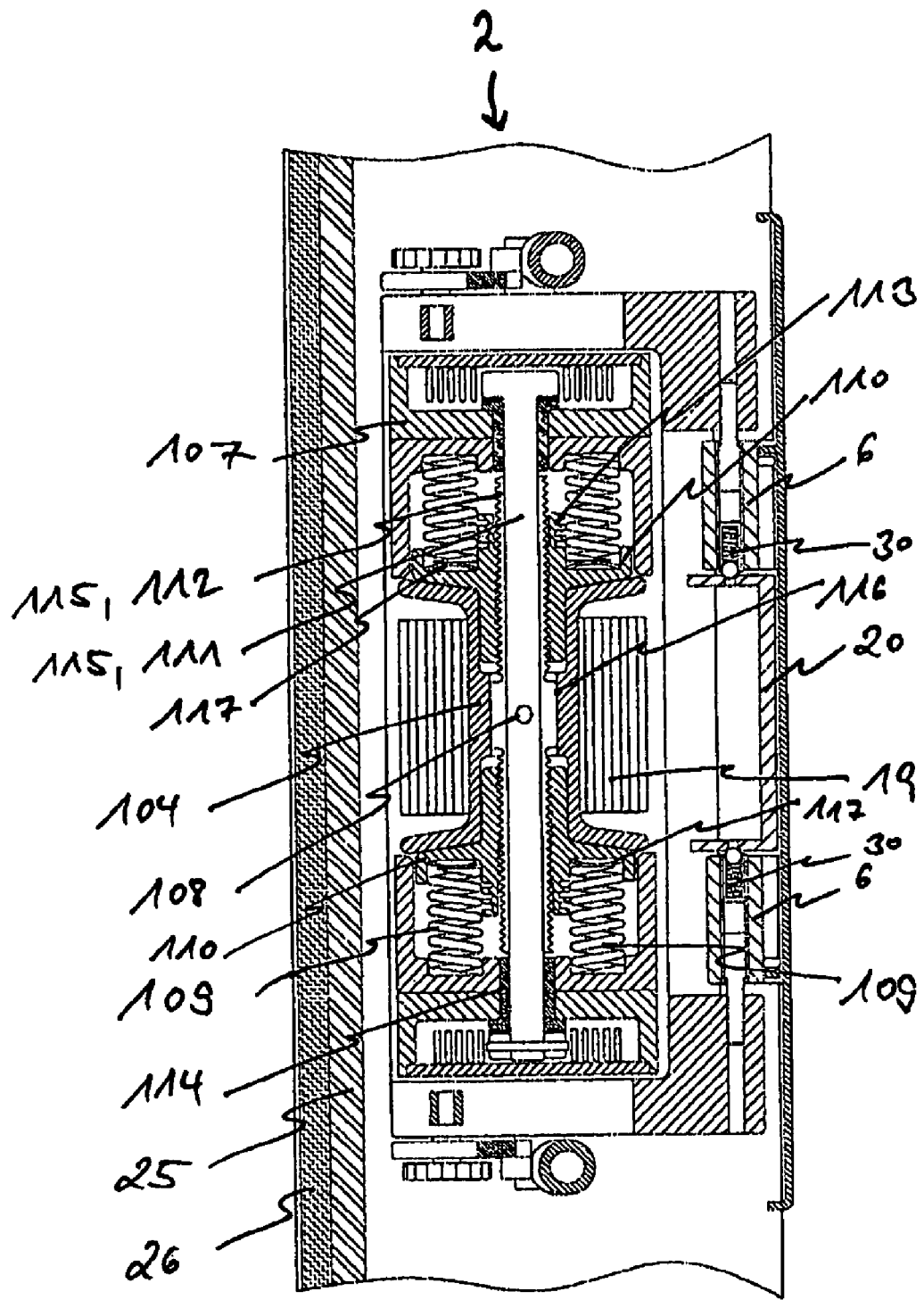
FIG. 2 shows a cross section of the deceleration device of the present invention.

The following paragraphs detail the deceleration device 2, which is mounted within doorpost 26. As will become apparent from FIG. 2, the deceleration device 2 comprises a housing in which the main components of the device 2 are installed. In particular, an elevating spindle 115 extends in a vertical direction and rotates in two bearings 114 which are supported on housing 107. The elevating spindle 115 may consist of two mating parts, a bearing shaft 111 and a shaft sleeve 112 featuring both right hand and left hand threads either side of a short central plain shank 116.

The deceleration device 2 moreover comprises a spool reel 104 which surrounds the plain shank 116 of the elevating spindle 115. A belt 19 is wound up on the spool reel 104 and is connected to a buckle 20 which is positively held in position by means of two ball catches. The shaft assembly 111, 112 slides into the spool reel 104 and is locked to the spool reel 104 by means of a single shear pin 108. At either end the shaft is supported by the plain bearings 114 which are in turn supported to the main housing 107.

On each side of the spool reel 104, steel collets 110 screw down the threads of the shaft sleeve 112. The collets 110 may be profile milled to a rounded hexagonal shape and fit within a matching profile of the housing 107. Between collet 110 and housing 107 six compression springs are installed on either side of the plain shank 116 in recessed pockets in both collet and housing, such that they are held in position by the collets 110 and the housing 107.

For example, in the event that a traction force is applied to the buckle 20 being connected to belt 19, belt 19 will be retracted from the spool reel 104 causing the spool reel 104 to rotate. This rotation will be directly transferred (via the shear pin) to the shaft assembly. As each of the collets 110 is captivated by its conforming profile in its respective housing 107, the rotational movement of the spool reel 104 and shaft assembly 111, 112 is transferred to the linear movement of the collets 110. The movement of the collets 110 is outwards from the spool reel 104 in the direction of the housing 107 such that the captivated springs are compressed along their free length. Thus for each 360° of rotation 1.5 mm of linear travel (standard 10.0 mm metric thread=1.5 mm pitch) may be achieved. The collective spring force is set to react to a load such that a predetermined constant force is required to extract the belt 19 from the spool reel 104. For example, the springs 109 might be designed to have a constant spring rate such that the force remains constant through the angular rotation of the spool 104. However as the belt 19 retracts from the spool 104 the diameter of the belt on spool reel 104 decreases. Hence, each successive rotation requires less length of belt due to the geometry of the belt on the spool reel 104. So by virtue of the belt geometry the reaction force to the door movement may be described as progressive.

Figure 1:
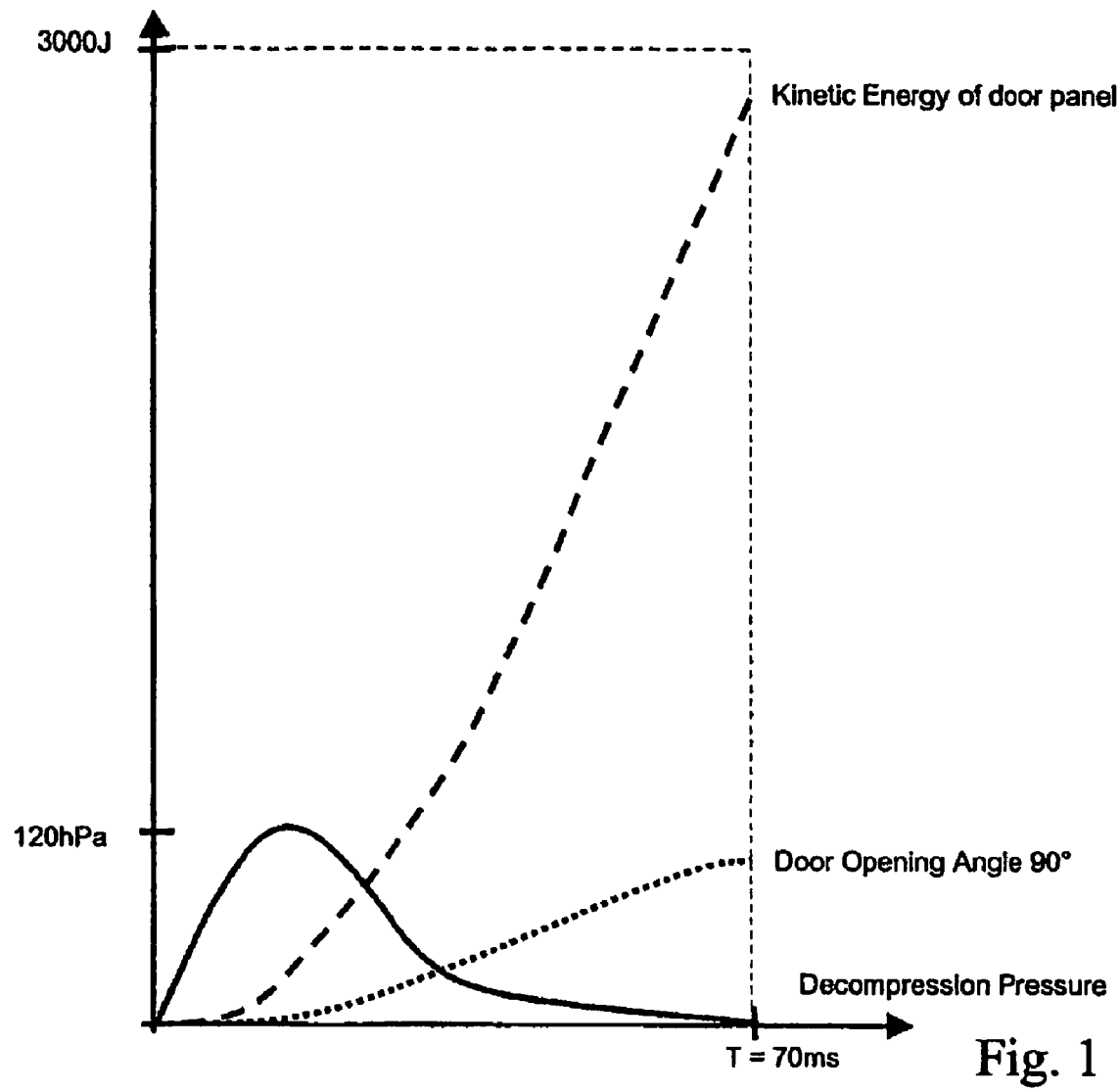
FIG. 1 shows a diagram illustrating pressure versus energy over door angle.

The first rotation of the spool reel 104 does not compress the springs 109 but brings both collets 110 into engagement. This is to allow a single free rotation of the spool reel 104 with minimal force. To this effect, a plurality of wave spring washers 117 having a negligible spring constant may be connected in series with the plurality of compression springs 109, so that during an initial rotation of the spool reel 104 minimal reaction load will be generated due to the negligible spring constant of the plurality of spring washers 117. The first complete rotation may be equivalent to the door opening by approximately 10° (belt extracted by 150 mm). This first free movement is intended to allow the door to open and to initially accelerate as quickly as possible so as not to adversely increase the pressure load across the door and is timed to a point where the pressure load peaks and begins to fall whereas the door energy overtakes the peak pressure load and begins to accelerate rapidly (cf. FIG. 1).

Additionally, where maintenance inspection or unit failure or accidental engagement of the belt 19 occurs during normal use, the first free rotation allows the door to open sufficient to allow detachment of the belt from the cabin side. The belt is self retracting by means of a drive spring situated at one end of the shaft assembly. The drive spring is set to retract the belt by one revolution and is connected to the shaft by means of a sprung loaded gear that will slip freely on the shaft if rotation exceeds one revolution.

The total travel of the collet 110 along the shaft assembly may be 10.5 mm which translates to 7 full turns (760 mm of belt extension). This allows the door to rotate through to its maximum venting area at 80°.

Prior to reaching the end stop a further method of energy absorption may be employed by incorporating an energy absorbing tube 113 into the end of the collets 110 such that the collets 110 contact the housing 107 before the maximum travel of 10.5 mm. Hence, the force which is necessary to collapse the energy absorbing tube 113 is dissipated due to the deformation of the energy absorbing tube 113.

Finally, further kinetic energy may be absorbed from the travelling door at an angle close to its maximum vent area due to the two part design of the elevating spindle 115. The shaft assembly 111, 112 is designed as two parts to allow shearing of the threaded sleeve 112 from the spool reel 104 without affecting the structural integrity of the main support bearing shaft 111. Hence, due to the relative movement of threaded sleeve 112 from the spool reel 104 shearing the single shear pin 108, further kinetic energy may be absorbed.

The intention is to absorb the maximum energy from the travelling door throughout its rotation from 10° onwards, without adversely increasing the pressure load, whilst limiting the maximum reaction load.

Figure 3:
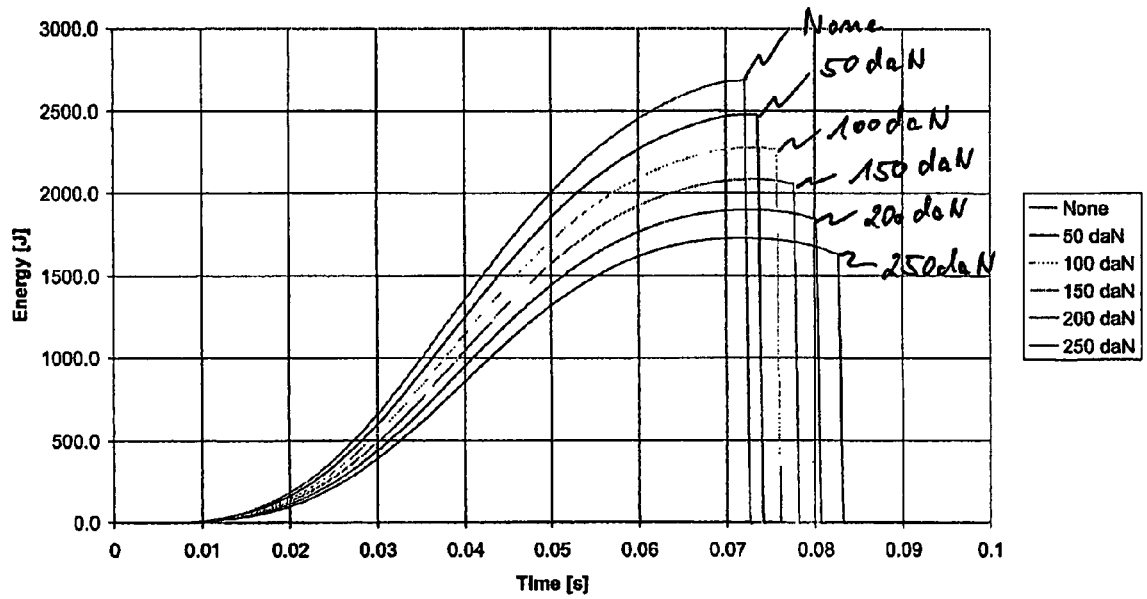
FIG. 3 shows a diagram illustrating the effect of the deceleration device with respect to the door energy.

In the following, the effect of the deceleration device 2 on the door will be illustrated. It can be seen from the following graph of FIG. 3 that reacting a force (normal to door plane) at the door centre of area by means of the deceleration device 2 throughout the doors rotation under decompression load will reduce the end energy. In particular:

Reacting a load of 50 daN at the door centre of area will reduce the end energy by 8% (2684 J to 2473 J).
Reacting a load of 100 daN at the door centre of area will reduce the end energy by 16% (2684 J to 2263 J).
Reacting a load of 150 daN at the door centre of area will reduce the end energy by 24% (2684 J to 2054 J).
Reacting a load of 200 daN at the door centre of area will reduce the end energy by 32% (2684 J to 1840 J).
Reacting a load of 250 daN at the door centre of area will reduce the end energy by 40% (2684 J to 1630 J).

Figure 4:
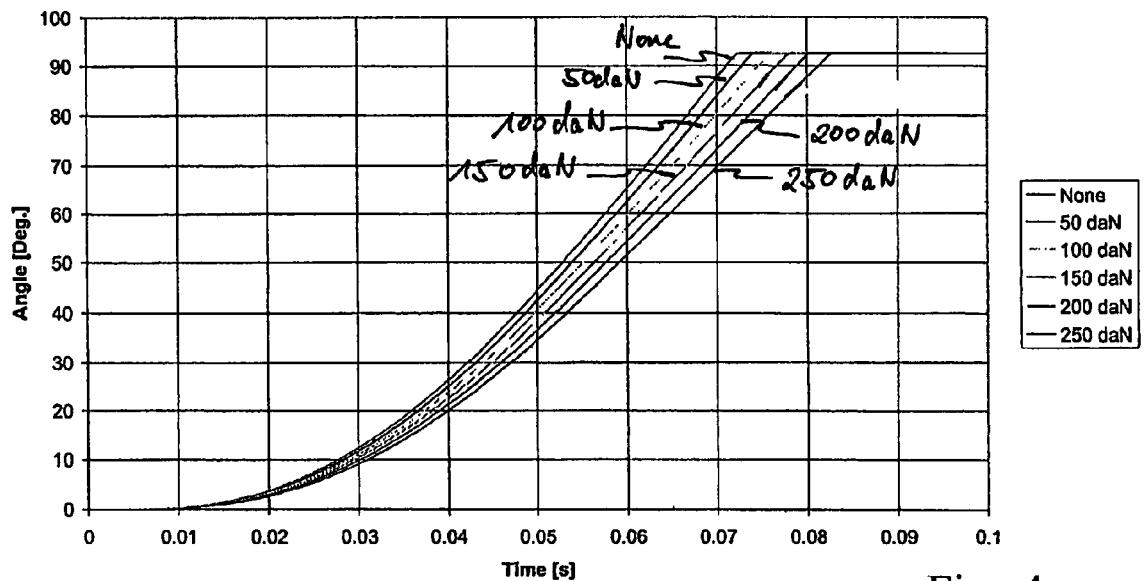
FIG. 4 shows a diagram illustrating the effect of the deceleration device with respect to the door opening time.

Assuming a series of reaction loads as described in the foregoing paragraph, the effect of door opening time is shown in FIG. 4. As will become apparent from FIG. 4, Reacting a load of 50 daN at the door centre of area increases the time taken to reach the minimum venting are (80°) by 3% (0.067 ms to 0.069 ms);
Reacting a load of 100 daN at the door centre of area increases the time taken to reach the minimum venting area (80°) by 4.5% (0.067 ms to 0.070 ms);
Reacting a load of 150 daN at the door centre of area increases the time taken to reach the minimum venting area (80°) by 7.5% (0.067 ms to 0.072 ms);
Reacting a load of 200 daN at the door centre of area increases the time taken to reach the minimum venting area (80°) by 10.5% (0.067 ms to 0.074 ms);
Reacting a load of 250 daN at the door centre of area increases the time taken to reach the minimum venting area (80°) by 13% (0.067 ms to 0.076 ms).

Figure 5:
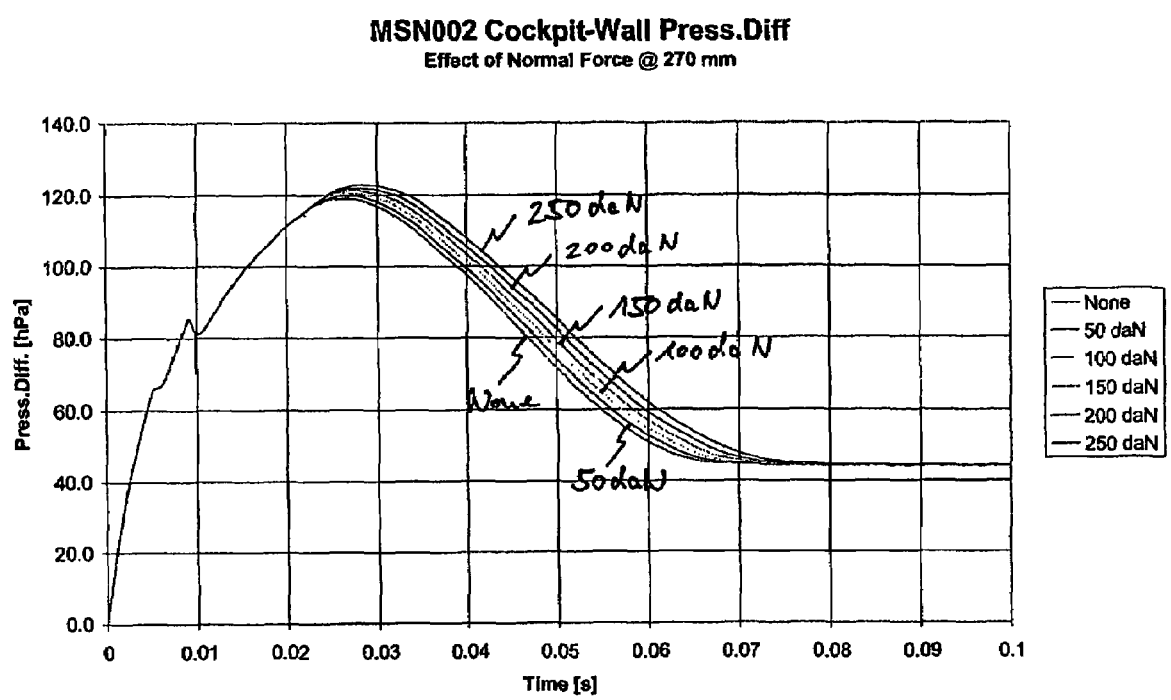
FIG. 5 shows a diagram illustrating the effect of the deceleration device with respect to the differential pressure.

Assuming a series of reaction loads as described above, the effect on the cockpit wall pressure difference is shown in FIG. 5, which shows that Reacting a load of 50 daN at the door centre of area increases the differential pressure by 0.67% (119 hPa to 119.8 hPa);
Reacting a load of 100 daN at the door centre of area increases the differential pressure by 1.26% (119 hPa to 120.5 hPa);
Reacting a load of 150 daN at the door centre of area increases the differential pressure by 1.85% (119 hPa to 121.2 hPa);
Reacting a load of 200 daN at the door centre of area increases the differential pressure by 2.5% (119 hPa to 122.0 hPa);
Reacting a load of 250 daN at the door centre of area increases the differential pressure by 3.2% (119 hPa to 122.8 hPa).

Hence, reacting a load equivalent to 250 daN at the door Centre of Area reduces the end energy by over 1000 Joules (40%) but increases the cockpit wall differential pressure by just 3.8 hPa (3.2%). Thus a method for controlling and reducing the end energy of the door without substantially increasing the pressure load upon the monuments can be realised by means of the present operation mechanism.

The deceleration device of the present invention has been described within the context of a dissipation of kinetic energy of a cockpit door. However, the deceleration device of the present invention may be used for other purposes in other applications as well, as it will be easily understood by the skilled person.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE LIST 2 deceleration device
19 belt
20 buckle
26 doorpost
104 spool reel
107 housing
108 shear pin
109 spring
110 collet
111 bearing shaft
112 Shaft sleeve
113 energy absorbing tube
114 bearing
115 elevating spindle
116 plain shank
117 wave spring washer

The invention claimed is:

1. A deceleration device for deceleration of a cockpit door, comprising:
- a spool reel carrying a belt being wound up on the spool reel;
- an elevating spindle being driven by the spool reel when the belt is being retracted from the spool reel;
- at least one collet screwed to the elevating spindle;
- at least one spring assembly being installed between the collet and a fixed bearing portion of the deceleration device; and
- at least one energy absorbing tube surrounding the elevating spindle to come prior into contact with the fixed bearing portion than the at least one collet, to dissipate further energy by deformation of the at least one energy absorbing tube;
- wherein the at least one collet is screwed towards the fixed bearing portion by retraction of the belt from the spool reel, thereby compressing only the spring assembly in a first phase, and both the spring assembly and the at least one energy absorbing tube in a second phase, whereby a reaction load is generated by the spring assembly counteracting the retraction of the belt; and
- wherein the at least one spring assembly and the at least one energy absorbing tube are arranged in parallel between the collet and a fixed bearing portion.

2. The deceleration device according to claim 1, wherein the spring assembly comprises a plurality of compression springs being situated between the collet and the fixed bearing portion and surrounding the elevating spindle.

3. The deceleration device according to claim 1, wherein the collet is shaped in the form of a polygon in plan view having a plurality of rounded edges forming receptacles for the plurality of compression springs.

4. The deceleration device according to claim 1, the deceleration device further comprising:
- at least one cup-shaped housing comprising a profile matching the polygonal shape of the collet to allow the collet to slide into the housing;
- wherein the fixed bearing portion forms part of the base of the housing, so that the plurality of compression springs being situated between the base and the collet.

5. The deceleration device according to claim 1, wherein the elevating spindle comprises a bearing shaft being rotatably mounted in the fixed bearing portion and a threaded shaft sleeve surrounding the bearing shaft, wherein the bearing shaft, the shaft sleeve and the spool reel surrounding the elevating spindle are locked to each other by means of a single shear pin.

6. The deceleration device according to claim 2, further comprising a plurality of spring washers having a negligible spring constant, wherein the plurality of spring washers is connected in series with the plurality of compression springs, so that during an initial rotation of the spool reel no reaction load will be generated due to the negligible spring constant of the plurality of spring washers.

7. The deceleration device of claim 1, wherein the deceleration device is symmetrically designed comprising an elevating spindle featuring right hand and left hand threads at either side of a central portion being surrounded by the spool reel, which due to a retraction force screws a first collet towards a first fixed bearing portion thereby compressing a first spring assembly situated between the first collet and the first fixed bearing and screws a second collet towards a second fixed bearing portion thereby compressing a second spring assembly situated between the first collet and the first fixed bearing portion.

8. A cockpit door system, the system comprising a cockpit door connected to a deceleration device for use in the event of a cockpit decompression, the deceleration device comprising:
- a spool reel carrying a belt being wound up on the spool reel;
- an elevating spindle being driven by the spool reel when the belt is being retracted from the spool reel;
- at least one collet screwed to the elevating spindle;
- at least one spring assembly being installed between the collet and a fixed bearing portion of the deceleration device; and
- at least one energy absorbing tube surrounding the elevating spindle to come prior into contact with the fixed bearing portion than the at least one collet, to dissipate further energy by deformation of the at least one energy absorbing tube;
- wherein the at least one collet is screwed towards the fixed bearing portion by retraction of the belt from the spool reel, thereby compressing only the spring assembly in a first phase, and both the spring assembly and the at least one energy absorbing tube in a second phase, whereby a reaction load is generated by the spring assembly counteracting the retraction of the belt; and wherein the at least one spring assembly and the at least one energy absorbing tube are arranged in parallel between the collet and a fixed bearing portion.

9. An aircraft comprising:
a cockpit door assembly comprising a deceleration device; the deceleration device comprising:
a spool reel carrying a belt being wound up on the spool reel;
an elevating spindle being driven by the spool reel when the belt is being retracted from the spool reel;
at least one collet screwed to the elevating spindle;
at least one spring assembly being installed between the collet and a fixed bearing portion of the deceleration device; and
at least one energy absorbing tube surrounding the elevating spindle to come prior into contact with the fixed bearing portion than the at least one collet, to dissipate further energy by deformation of the at least one energy absorbing tube;
wherein the at least one collet is screwed towards the fixed bearing portion by retraction of the belt from the spool reel, thereby compressing only the spring assembly in a first phase, and both the spring assembly and the at least one energy absorbing tube in a second phase, whereby a reaction load is generated by the spring assembly counteracting the retraction of the belt; and
wherein the at least one spring assembly and the at least one energy absorbing tube are arranged in parallel between the collet and a fixed bearing portion.

* * * * *